Aug. 6, 1968  D. A. CHOVAN  3,395,889
ANGLE COCK WITH POSITIVE SEALING PRESSURE REDUCTION MEANS
Filed Sept. 29, 1965  3 Sheets-Sheet 1

INVENTOR.
Dale A. Chovan
BY
*G. G. Steinmiller*
Attorney

Aug. 6, 1968  D. A. CHOVAN  3,395,889
ANGLE COCK WITH POSITIVE SEALING PRESSURE REDUCTION MEANS
Filed Sept. 29, 1965  3 Sheets-Sheet 2

INVENTOR.
Dale A. Chovan
BY
A. A. Steinmiller
Attorney

Aug. 6, 1968  D. A. CHOVAN  3,395,889
ANGLE COCK WITH POSITIVE SEALING PRESSURE REDUCTION MEANS
Filed Sept. 29, 1965  3 Sheets-Sheet 3

INVENTOR.
Dale A. Chovan
BY
O.O. Steinmiller
Attorney

United States Patent Office 3,395,889
Patented Aug. 6, 1968

3,395,889
ANGLE COCK WITH POSITIVE SEALING
PRESSURE REDUCTION MEANS
Dale A. Chovan, Trafford, Pa., assignor to Westinghouse Air Brake Company, Wilmerding, Pa., a corporation of Pennsylvania
Filed Sept. 29, 1965, Ser. No. 491,322
4 Claims. (Cl. 251—163)

ABSTRACT OF THE DISCLOSURE

An angle cock having a rotary conical key carrying on its periphery a plurality of sealing panels which are biased into sealing engagement against the inner surface of the bore in the cock body in the closed position of the cock. Two sets of cooperating cam means are provided, one set between the key and one edge of the panels, and another between the cock body and the other edge of the panels for completely retracting the sealing panels from the inner surface of the bore during rotary movement of the key, thereby reducing wear on said panels and said inner surface to a minimum.

---

Figure 1:
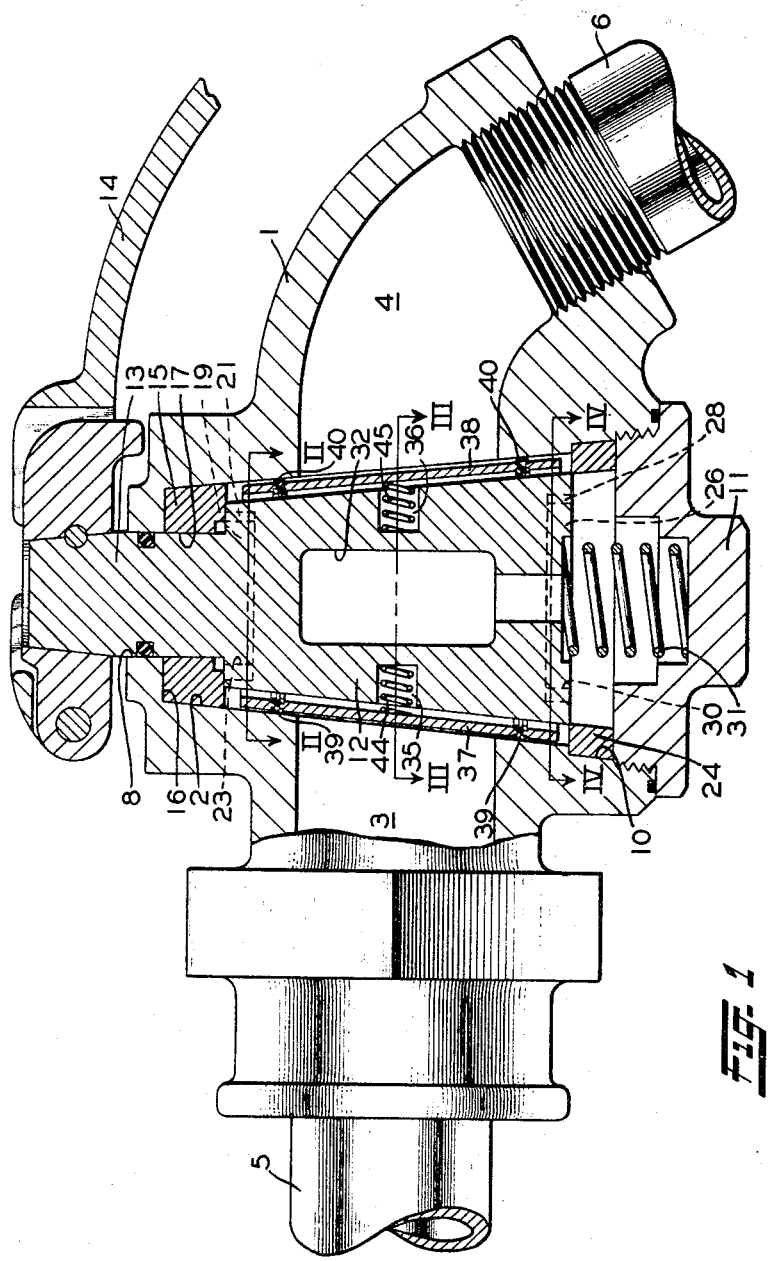

Angle cocks for use on railway cars have continually undergone modifications to overcome undesirable characteristics such as are found, for example, in the type using a conical cock key precisely machined to fit in a complementarily machined bore in the valve body wherein said key is biased toward the smaller diameter of the bore by a spring acting on the bottom of the key. The friction provided by the metal-to-metal contact between the key surface and the bore of the valve body, however, does not necessarily provide smooth effortless turning of the key within the valve body, nor does such metal-to-metal construction always insure an air-tight seal in the cut-off position of the key, especially after some wear on the contacting surfaces. Repair of the metal-to-metal type angle cock in the field is highly impractical, thereby necessitating replacement of the entire unit which is a costly procedure. Consequently, means such as rubber composition sealing rings have been provided on the cock key in surrounding relation thereto to provide a buffer between the cock key and the surface of the casing bore, said sealing rings acting to reduce the friction between the key and the casing as well as to seal against leakage. Such an arrangement, however, has not proven most successful either in that the sealing rings, being in constant frictional contact with the casing bore during rotation of the cock key, wear at a rapid rate. The metal-to-metal arrangement and the sealing ring arrangement above described, therefore, do not provide the extended service life described in angle cocks.

The principal object of this invention, therefore, is to provide an improved angle cock having sealing elements of a resilient material, which sealing elements are so arranged relative to the cock key and the valve body as to eliminate not only metal-to-metal contact between said key and said valve body, but to also eliminate moving frictional contact between the sealing elements and the valve body during rotation of the cock key, whereby the cock key may be rotated smoothly and with less effort and the service life of the angle cock is greatly prolonged to reduce the costs in maintenance as well as replacement. The sealing elements are so arranged as to facilitate replacement thereof in the field when necessary without removing the angle cock from the car when in service.

The improved angle cock embodying the invention comprises a casing having a chamber with a pair of fluid passageways communicating with said chamber and extending diametrically oppositely therefrom through said casing. The respective wall portions of the casing within the chamber and surrounding the openings of the respective passageways into said chamber constitute respective valve seats with which a movable cock key cooperates to control the passage of fluid through such chamber between said passageways. The movable cock key carries two diametrically oppositely disposed replaceable sealing members each of which is provided with a gasket or sealing element. The replaceable sealing members cooperate with respective spaced cam means which cause said sealing members and the respective gaskets carried thereon to be moved out of frictional contact with the internal surface of the chamber wall upon rotation of the cock key to a non-sealing or open position. Upon rotation of the cock key to a sealing or closed position, the sealing members are disengaged from the respective cam means and are biased outwardly away from the cock key toward the internal surface of the chamber wall so that the gaskets carried thereon make sealing engagement with the respective valve seats surrounding the passageway openings into said chamber.

Figure 2:
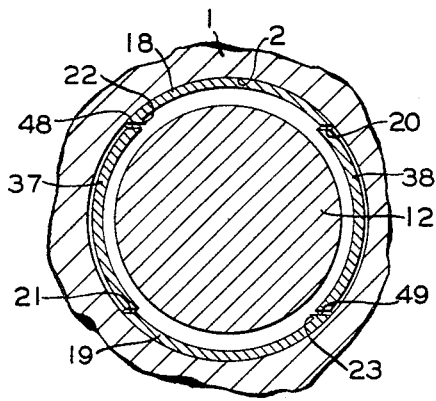
Figure 3:
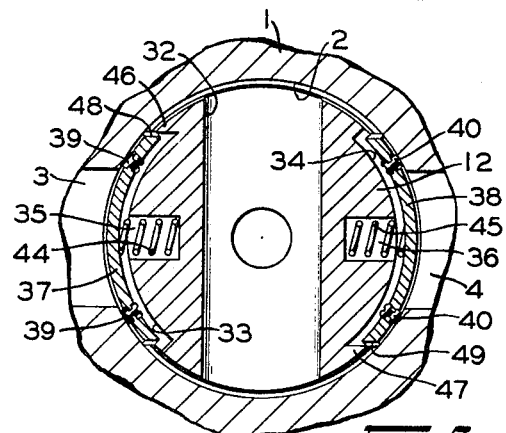
Figure 4:
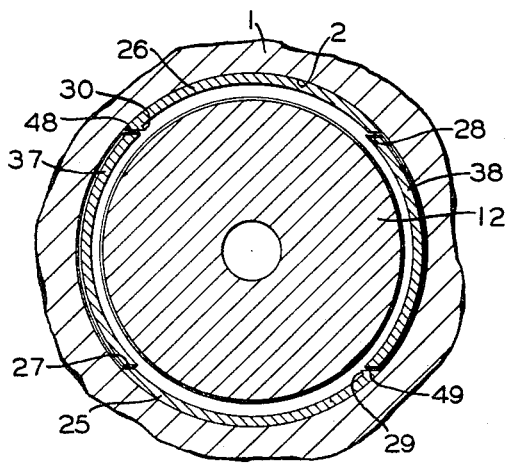
Figure 5:
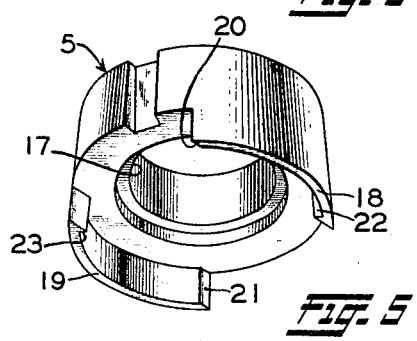
Figure 6:
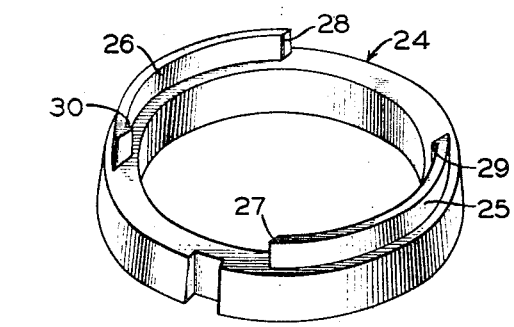
Figure 7:
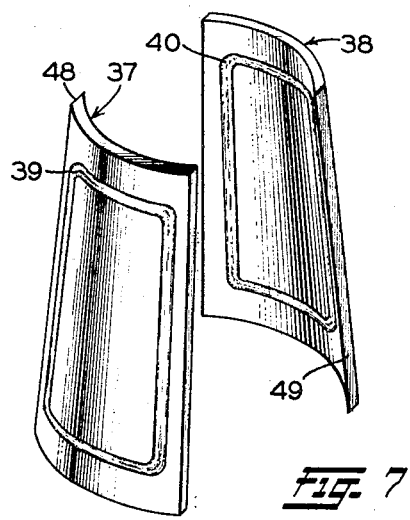
Figure 8:
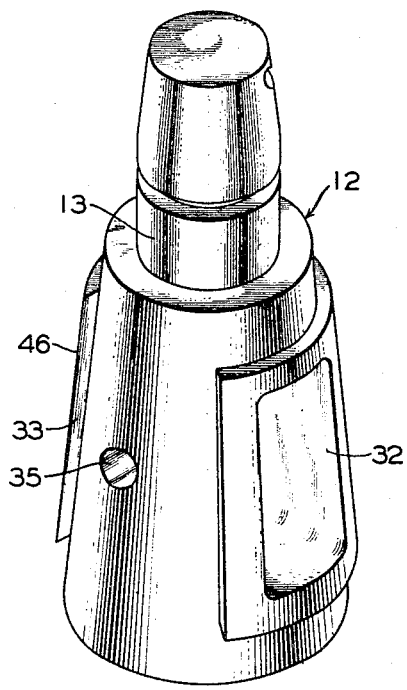
Figure 9:
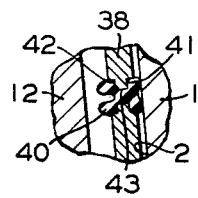
Figure 10:
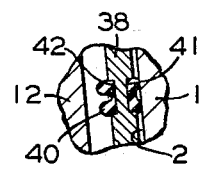

In the drawings, FIG. 1 is a side elevational view, mostly in a section, of an angle cock illustrating the cock key in closed position; FIG. 2 is a sectional view taken along line II—II of FIG. 1, as viewed in the direction indicated by the arrows; FIG. 3 is a sectional view taken along line III—III of FIG. 1, as viewed in the direction indicated by the arrows; FIG. 4 is a sectional view taken along line IV—IV of FIG. 1, as viewed in the direction indicated by the arrows; FIG. 5 is a perspective view of a cam member comprising a component of the angle cock shown in FIG. 1; FIG. 6 is a perspective view of another cam member comprising a component of the angle cock shown in FIG. 1; FIG. 7 is a perspective view of sealing members comprising further components of the angle cock shown in FIG. 1; FIG. 8 is a perspective view of the cock key comprising a component of the angle cock shown in FIG. 1; FIG. 9 is a fragmentary sectional view on a larger scale, illustrating the structure of the sealing members shown in FIG. 7; and FIG. 10 is a fragmentary sectional view on a larger scale, further illustrating the structure of the sealing members shown in FIG. 7.

Referring to the drawings and more particularly to FIG. 1, the angle cock comprises a body casing 1 having a frusto-conical bore 2 forming a chamber with a pair of diametrically oppositely and coaxially disposed passageways 3 and 4 extending through said casing, each of said passageways having one end opening into said chamber and the other end connected to fluid pressure conduits 5 and 6, respectively. The upper end of conical bore 2, as viewed in FIG. 1, opens to the exterior of body casing 1 via a coaxially aligned bore 8 formed in said body casing while the other end of said conical bore opens to the exterior of said body casing via a coaxially aligned bore 10 formed in said casing and the lower portion of which is threaded. The threaded portion of bore 10 receives a screw cap 11, removal of which provides access to conical bore or chamber 2 for insertion of parts located therein and to be hereinafter described.

Rotatably journaled within chamber 2 is a generally frusto-conically shaped cock key 12 conforming to the tapered contour of said chamber and having an upwardly extending stem portion 13 of uniform diameter which is snugly rotatable in the bore 8 of casing 1 and extends therethrough externally of said casing so as to have suitably connected at the external end thereof a handle 14 by which said key may be rotated relative to the casing.

An annular cam member 15 is removably disposed in the upper end of chamber 2 against a shoulder 16 formed in casing 1 such that a bore 17 formed in said cam member is coaxially aligned with and of the same diametral dimension as bore 8 to encompass the stem 13 of key 12 which is rotatable in both said bores. The cam member 15 is locked against rotation relative to casing 1, when the cock key 12 is rotated by a key (not shown) disposed in a keyway formed in said cam member (see FIG. 5) and a keyway (not shown) in the casing.

Annular cam member 15 has a pair of diametrically oppositely disposed arcuate cam portions 18 and 19 formed on the lower end thereof, as viewed in FIGS. 1 and 5, adjacent the outer periphery, as may be clearly seen in FIG. 5. With the cam member 15 properly located in chamber 2, the cam portions 18 and 19 are disposed coaxially with the axis of key 12 and on diametrically opposite sides of the axis of fluid flow through passageways 3 and 4. As may be seen in FIG. 2, the external peripheral surfaces of the arcuate cam portions 18 and 19 conform to and abut against the internal conical surface of chamber 2, said cam portions each having an axially disposed inclined cam surfaces 20 and 21, respectively, at diametrically corresponding ends, and, in a similar manner, each having at the other ends thereof a stop shoulder 22 and 23, respectively, for a purpose to be hereinafter set forth.

An annular cam member 24, somewhat similar in construction to cam member 15 but of greater diameter, is located in oppositely facing relation to said cam member 15 in the lower end of chamber 2 adjacent bore 10. Cam member 24 is held by the cap nut 11 in abutting position against an internal stop shoulder formed in casing 1 adjacent the lower end of bore 2, and, similarly to cam member 15, said cam member 24, as may be seen in FIG. 6, is also provided with a key-way by which it is keyed against rotation in the casing. Annular cam member 24 also has a pair of diametrically oppositely disposed arcuate cam portions 25 and 26 on the upper end thereof, as viewed in FIGS. 1 and 6, but set in from the outer periphery thereof to clear the internal stop shoulder formed in casing 1. Similarly to cam portions 18 and 19 of cam member 15, the cam portions 25 and 26 have their outer peripheral surfaces abutting against the internal conical surface of chamber 2, said cam portions 25 and 26 also being disposed similarly to said cam portions 18 and 19 with respect to the axis of key 12 and the axis fluid flow through passageways 3 and 4. The cam portions 25 and 26 are axially aligned oppositely to cam portions 18 and 19 of cam member 15, but diametrically set apart on cam member 24 a greater distance than those on cam member 15 due to the greater diameter of cam member 24. As may be seen in FIGS. 4 and 6, the cam portions 25 and 26 are also provided with inclined cam surfaces 27 and 28, respectively, and with stop shoulders 29 and 30 each arranged similarly to and disposed axially opposite the inclined cam surfaces 20 and 21 and stop shoulders 22 and 23, respectively, of the cam member 15.

When rotated between an open position and a closed or cutoff position, to be presently described, key 12 is guided by stem 13 in bores 8 and 17. A spring 31 compressed between the lower end of key 12 and the cap nut 11 urges and maintains the upper end of the tapered portions of said key against the underside of cam member 15 within the cam portions 25 and 26. Key 12 has a bore 32 extending therethrough perpendicularly to the axis of said key and so situated that in the open position of said key, bore 31 is in axial alignment with and establishes communication between passageways 3 and 4. Upon rotation of key 12 by the handle 14 through an angle of 90° out of its open position to its closed or cutoff position, bore 31 assumes an angular position in which communication between passageways 3 and 4 is cut off.

Key 12 is provided adjacent the peripheral surface thereof with two longitudinally extending shallow recesses or channels 33 and 34 formed, respectively, on diametrically opposite sides of said key and conforming to the tapered contour thereof, said channels extending substantially the entire length of said key and being so disposed thereon that an arcuately bisecting plane thereof is normal to the axis or bore 32, as seen in FIGS. 3 and 8. As also seen in FIGS. 1, 3 and 8, key 12 has formed therein two axially aligned cylindrical recesses 35 and 36 opening centrally to the respective recesses 33 and 34 and perpendicularly to the axis of bore 32. In the position shown in FIG. 3, that is, the closed position of key 12, the common axis of the cylindrical recesses 35 and 36 substantially coincides with the axis of passageways 3 and 4.

The respective recesses 33 and 34 are adapted to receive two arcuately shaped sealing or valve members in the form of arcuately shaped panels 37 and 38, respectively, conforming to the conical shape of key 12. The sealing members 37 and 38 have molded thereon, in the form of closed loops, sealing elements or beads 39 and 40, respectively, as seen in FIG. 7. The sealing elements 39 and 40 are preferably of a resilient material, such as rubber, and are arranged on the respective sealing members 37 and 38 so as to be operable to a seated position on the area of the inner wall surface surrounding the respective openings of passageways 3 and 4 when key 12 is in its closed position, said area of the inner wall constituting respective valve seats surrounding said openings. Thus, upon operation of the sealing elements 39 and 40 to their respective seated positions, in a manner to be hereinafter disclosed, communication between passageways 3 and 4 through chamber 2 is cut off.

The structure of the sealing beads 39 and 40 is more clearly shown in the enlarged views of FIGS. 9 and 10, both of which are sectional views of the sealing bead 40 on the sealing member 38 taken at two different points, it being understood that bead 39 on sealing member 37 is similarly constructed. The sealing bead 40 is molded in grooves 41 and 42 formed on the outer and inner faces, respectively, of the sealing member 38, said grooves having several holes 43 (only one of which is shown in FIG. 9) drilled therethrough between the outer and inner faces and spaced at suitable intervals thereon to thereby provide integrally connecting material between the outer and inner halves of the beads (see FIG. 9, particularly). The respective recesses 35 and 36 receive springs 44 and 45 which bias the respective sealing members 37 and 38 outwardly from the key 12 toward the surface of bore 2.

In considering the operation of the angle cock embodying the invention, it will be assumed that conduit 5 is charged with fluid under pressure, and, as shown in FIGS. 1 through 4, key 12 is in its cut-off position. Although the respective sealing members 37 and 38 are biased by springs 44 and 45 toward the inner surface of the casing wall forming chamber 2, said springs are of a relatively light compression rating and, therefore, do not exert a biasing force on said sealing members sufficient for effecting a sealing relationship between the sealing elements 39 and 40 and the inner casing surface surrounding the respective openings to passageways 3 and 4, but merely serve to bias the sealing members 37 and 38 outwardly from the channels 33 and 34 for reasons which will become evident hereinafter.

With conduit 5 charged with fluid under pressure, as above noted, and with the cock key 12 in its closed position in which it is shown in FIG. 1 of the drawings, fluid pressure in passageway 3 acting on the adjacent side of sealing member 37 overcomes the relatively light opposition of spring 44 and thereby flows past the sealing element 39 to prevail in chamber 2 and on the side of said sealing member adjacent said chamber to balance the fluid pressure forces on the sealing member. Fluid pressure in chamber 2 also acts on the adjacent side of sealing member 38. If it be assumed that conduit 6 is disconnected and open to atmosphere, then passageway 4 and the side of sealing member 38 adjacent thereto are subject to atmospheric pressure only. Thus, fluid pressure acting in chamber 2 and on the opposite side of said sealing member is effective for causing the resilient sealing element 40 to be seated against the inner casing wall surrounding the opening to passageway 4 for making an airtight seal against escape of fluid pressure to atmosphere via conduit 6.

Of course with a reverse situation, that is, with conduit 5 open to atmospheric pressure and with conduit 6 charged with fluid under pressure, the sealing conditions of the sealing members 37 and 38 would also be reversed, assuming the key to be in its closed position.

To open communication between passageways 3 and 4, key 12 is operated to its open position by rotating said key with the handle 14 in a counterclockwise direction, as viewed in FIGS. 2 through 4. Referring to FIG. 3, it will be noted that one side of each of the channels 33 and 34, in which sealing members 37 and 38, respectively, are nested, is provided with an acutely angled leading edge or surface, in this instance, the upper left and lower right edges 46 and 47, respectively, as viewed in said FIG. 3. Each of the sealing members 37 and 38 is provided with complementarily angled edges or surfaces 48 and 49 adjacent the edges 46 and 47, so that, at the instant that rotation of the key 12 in a counterclockwise direction is commenced, the edges 46 and 47 of said key engage the edges 48 and 49 of the sealing members, respectively, to shift the sealing members with the key and incidentally effect a wedging action whereby the respective edges of sealing members are caused to be moved radially away from the inner casing wall forming chamber 2 and inwardly toward the bottom of the respective channels 33 and 34.

Rotation of key 12 in a counterclockwise direction, as viewed in FIGS. 2 through 4, also causes the respective edges of the sealing members 37 and 38 adjacent the inclined cam surfaces 20, 21, 27 and 28 of the respective cam members 18, 19, 25 and 26 to contact and ride up over said cam surfaces at the onset of said rotation. In other words, in the action immediately above described, the valve members or panels 37 and 38 function as cam followers. In this manner, the entire sealing members 37 and 38 are caused to be moved radially inwardly and out of contact with the respective wall portions of chamber 2 immediately upon commencement of rotation of key 12 and to be maintained in such disposition until said key is returned to its closed position because the upper and lower lateral or curved portions of said sealing members ride inside the cam members 18, 19, 25 and 26 during rotation thereof with key 12 whether in a counterclockwise direction or in a clockwise direction. With the sealing members 37 and 38 thus moved away from the inner casing wall during rotation of key 12, the sealing beads 39 and 40 are also out of contact with the inner wall surface during such rotation of key 12 and, therefore, little or no frictional wear of said sealing beads occurs.

The amount of counterclockwise rotation of key 12, or its open position, is limited by abutting contact of the leading edges of the sealing members 37 and 38 with the stop shoulders 22, 23, 29 and 30 of the cam members 18, 19, 25 and 26, respectively, to thereby assure axial alignment of bore 32 with passageways 3 and 4.

Of course, clockwise rotation of key 12 with the handle 14, as viewed in FIGS. 2 through 4, restores said key to its cut-off position above defined. Again, as was above noted, the sealing members 37 and 38 are held away from the inner wall surface of the casing 1 by the cam members 18, 19, 25 and 26 during such rotation until the sealing members are in respective positions substantially opposite the openings between said cam members, whereupon the springs 44 and 45 bias said sealing members radially outwardly from the channels 33 and 34, respectively, and against the inner casing wall in surrounding relation to the openings of passageways 3 and 4 into chamber 2.

Having now described the invention, what I claim as new and desire to secure by Letters Patent is:

1. An angle cock comprising, in combination:

(a) a casing having a frusto-conically shaped chamber formed coaxially therein and a pair of axially aligned passageways formed in said casing transversely to said chamber and on diametrally opposite sides thereof with one end of each passageway opening into said chamber, (b) a key member coaxially journaled in said chamber of said casing and having a bore extending transversely therethrough, (c) said key member being rotatable to an open position in which said bore is placed in alignment with the ends of said passageways for communicating said passageways with each other via said bore and being rotatable to a cut-off position in which said bore is moved out of alignment with said passageways for cutting off communication therebetween, (d) a pair of arcuately shaped sealing panels conforming to the inner surface of the casing wall defining said chamber and disposed, respectively, in correspondingly shaped recesses on diametrally opposite sides of said key member at a 90° angular relationship to said bore for rotation with the key member, (e) a resilient sealing element provided on each of said sealing panels, said sealing elements having respective seated positions on the area of said inner surface of said casing wall surrounding the ends of said passageways, respectively, for making sealing contact therewith in asid cut-off position of said key member and being operable to respective unseated positions out of sealing contact with said inner surface, (f) a biasing spring compressed between each of said sealing panels and said key member for biasing said sealing panels radially outwardly away from said key member and toward said inner surface defining said chamber for effecting operation of said sealing elements to their respective seated positions, (g) a pair of annular cam members removably secured in said casing adjacent the opposite ends, respectively, of said key member and perpendicularly to the axis thereof, (h) each of said annular cam members having formed adjacent its periphery a pair of diametrally oppositely arranged arcuate cam portions correspondingly positioned on said annular cam members and at 90° relative to said passageways, (i) said arcuate cam portions being so positioned and of such arcuate length as to engage said sealing panels and cause said resilient sealing elements carried thereon, upon rotation of said key member to its said open-position and reversely to its said cut-off position, to be moved radially inwardly toward said key member against biasing action of said biasing springs to their respective unseated positions and out of contact with said inner surface of the casing wall during the entire amount of said rotation, and to disengage said sealing panels, upon restoration of said key member to its said cut-off position, to render said biasing springs effective for restoring said sealing elements to their respective seated positions on said area of said inner surface surrounding the ends of said passageways, and (j) a stop shoulder formed on the corresponding end of each of said arcuate cam portions for limiting the rotation of said key member to an angle determining its said open position.

2. An angle cock comprising, in combination:

(a) a casing having a chamber formed therein and a pair of passageways each having one end opening into said chamber at diametrally opposite sides thereof, (b) valve seats surrounding the respective ends of said passageways opening into said chamber, (c) a key member coaxially and rotatably journaled in said chamber and having a bore extending transversely therethrough, said key member being rotatable to an open position in which said bore is in alignment with the ends of said passageways for communicating said passageways with each other via said bore and being rotatable to a cut-off position in which said bore is moved out of alignment with said passageways for cutting off communication therebetween, (d) a pair of sealing members rotatable with said key member and biased radially outwardly therefrom toward the inner surface of the casing wall defining said chamber, said sealing members being operable, in the cut-off position of said key member, to a seated position on said valve seats for sealing off the ends of said passageways, respectively, and thereby cutting off communication therebetween, (e) cam means carried by said casing and effective during rotation of said key member from its said cut-off position to its said open position for engaging and moving said sealing members radially inwardly toward said key member and out of contact with the inner surface of the casing wall for preventing wear of said valve seats during such rotation of the key member, and (f) means formed partly on said key member and partly on said sealing members and acting cooperatively for assisting said cam means, at the onset of rotation of said key member out of its said cut-off position, in effecting radially inward movement of said sealing members out of contact with said inner surface of the casing wall.

3. An angle cock comprising, in combination:

(a) a casing having a chamber formed therein and a pair of passageways each having one end opening into said chamber at diametrally opposite sides thereof, (b) valve seats surrounding the respective ends of said passageways opening into said chamber, (c) a key member coaxially and rotatably journaled in said chamber and having a bore extending transversely therethrough, said key member being rotatable to an open position in which said bore is in alignment with the ends of said passageways for communicating said passageways with each other via said bore and being rotatable to a cut-off position in which said bore is moved out of alignment with said passageways for cutting off communication therebetween, (d) a pair of sealing members rotatable with said key member and biased radially outwardly therefrom toward the inner surface of the casing wall defining said chamber, said sealing members being operable, in the cut-off position of said key member, to a seated position on said valve seats for sealing off the ends of said passageways, respectively, and thereby cutting off communication therebetween, (e) cam means comprising:

(i) a pair of annular cam members removably secured in said chamber of said casing adjacent the respective opposite ends and perpendicularly to the axis of said key member, (ii) a pair of diametrally oppositely disposed arcuate cam portions formed on each of said annular cam members adjacent the respective periphery thereof and at 90° relative to the ends of said passageways, (iii) said arcuate cam portions being so positioned and of such length as to engage and cause said sealing members, upon rotation of said key member to its said open position and reversely to its said cut-off position, to be moved radially inwardly relative to said key member out of contact with the inner surface of the casing wall during the entire amount of such rotation, and to disengage said sealing members, upon restoration of said key member to its said cut-off position, and thereby effect restoration thereof to their seated positions on said valve seats, respectively.

4. An angle cock, as defined in claim 3, wherein said annular cam members are further characterized in that the arcuate cam portions thereon are each provided at corresponding ends thereof with stop shoulders for limiting rotation of the key member to a position corresponding to its said open position.

References Cited

UNITED STATES PATENTS

| | | | |
|---|---|---|---|
| 1,872,417 | 8/1932 | Dalldorf | 251—175 |
| 2,114,789 | 4/1938 | Urquhart | 251—175 |
| 2,295,862 | 9/1942 | Ohls | 251—163 |
| 2,505,998 | 5/1950 | Sleeper | 251—163 |
| 2,516,425 | 7/1950 | Sarver | 251—163 X |

CLARENCE R. GORDON, *Primary Examiner.*